Figure 1:
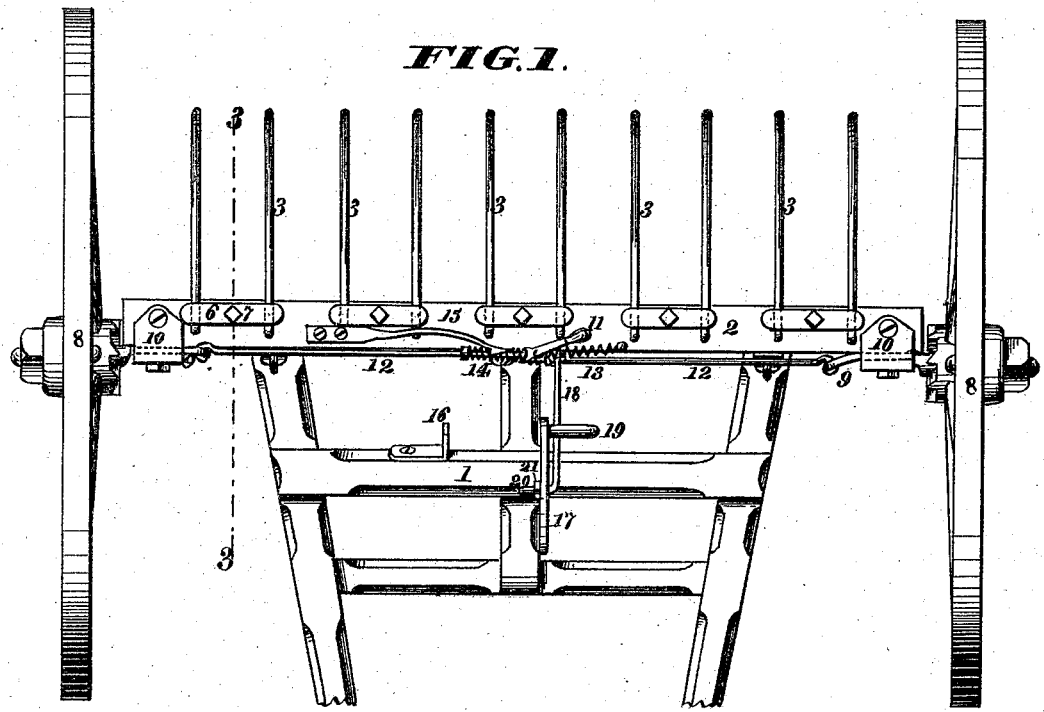

C. EDGAR.
Horse Hay-Rakes.

No. 155,505.

2 Sheets--Sheet 1.

Patented Sept. 29, 1874.

WITNESSES
Jas. L. Ewin
Walter Allen

INVENTOR
Charles Edgar
By Knight Bro. Attorneys.

2 Sheets--Sheet 2.

C. EDGAR.
Horse Hay-Rakes.

No. 155,505. Patented Sept. 29, 1874.

WITNESSES
Jas. L. Ewin
Walter Allen

INVENTOR
Charles Edgar
By Knight Bros Attorneys

THE GRAPHIC CO. PHOTO-LITH. 39 & 41 PARK PLACE, N.Y.

UNITED STATES PATENT OFFICE.

CHARLES EDGAR, OF DAYTON, OHIO.

IMPROVEMENT IN HORSE HAY-RAKES.

Specification forming part of Letters Patent No. 155,505, dated September 29, 1874; application filed August 28, 1874.

*To all whom it may concern:*

Be it known that I, CHARLES EDGAR, of Dayton, in the county of Montgomery and State of Ohio, have invented a new and useful Improvement in Horse-Rakes, of which the following is a specification:

This invention relates to that class of sulky-rakes known as "horse-dumpers," and more particularly to those rakes in which curved spring-teeth are attached directly to the axle, which oscillates by alternate attachment to the ground-wheels and release therefrom, to discharge the loads of the teeth as successively gathered.

The object of the first part of the present invention is to provide in a peculiar manner, and without complication of parts, for the simultaneous attachment of an oscillating rake-head axle to the hubs of both of the ground-wheels, the automatic retention of the engaging-pawls in projected position, the automatic release of the axle from either or both of the ground-wheels when the rake is turned or backed while the pawls are projected, and the automatic release of the axle, so as to return the teeth to working position when their load is discharged, the parts being constructed and operating as hereinafter specified. Yielding springs of small size are employed, and they are so applied as to be free from any strain except when called into play. The locking-catch is of very simple form, and is tripped by a lifting-tappet, so as to preclude friction or strain on these parts. The hand-lever and locking-catch are attached directly to the face and top of the axle, respectively, so as to require nothing more than bolts for their support. The objects of the second part of the invention are to combine in a single device the functions of a treadle and its accessories for holding the teeth in working position, at the will of the operator, and means for adjusting them as to height with facility, and at the same time to render this device peculiarly simple and compact, so as to require no arm on the rake-head or axle for its application thereto, and so as to dispense with any projecting arm for the reception of the foot, the stirrup-bar being arranged at the middle of the device, which is in the form of a toggle, so constructed and arranged as not to lock.

The object of the third part of the invention is to provide for attaching tight rake-teeth to the top of the rake-head, so as to secure them in pairs by a single wood-screw to each pair, as hereinafter set forth.

Figure 2:
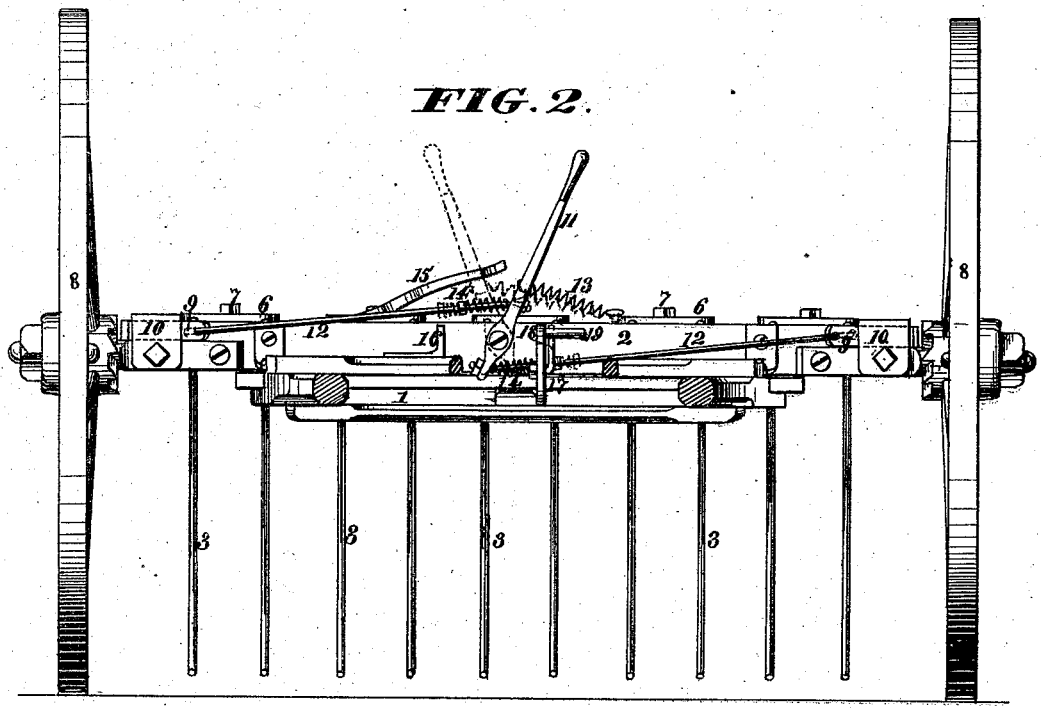
Figure 3:
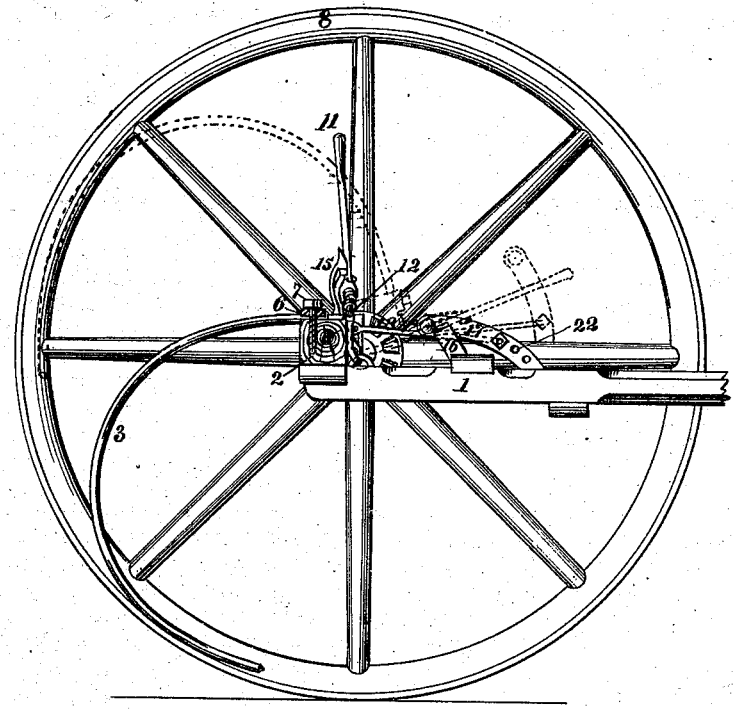
Figure 4:
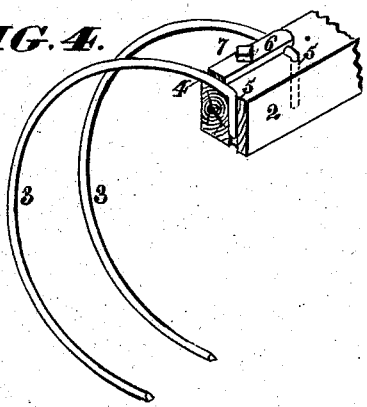

In the accompanying drawing, Figure 1 is a plan view of a horse-rake in working condition, illustrating this invention, the driver's seat and portions of the thills being omitted. Fig. 2 is a front elevation of the same, illustrating, by dotted lines, the projection of the pawl-bolts of the dumping mechanism. Fig. 3 is a side view, partly in vertical section, on the line 3 3, Fig. 1, and serving, by dotted lines, to illustrate the elevation of the rake-teeth. Fig. 4 is a sectional perspective view of a pair of teeth, with a portion of the axle, illustrating the improved tooth-fastening.

This improved horse-rake has a thill-frame, 1, formed at the rear end of a pair of thills, which are attached by hinges to the lower front corner of a rake-head axle, 2. The hinges are located near the rear extremity of the thill-frame, a single transverse bar of the thill-frame projecting beneath the axle. Steel rake-teeth 3, which may be of any preferred pattern, are attached to the axle in the following manner: Horizontal transverse grooves 4. and vertical sockets 5 at the front ends of these grooves, are formed in the top of the axle, the latter serving to receive the ordinary straight hooks at the upper ends of the teeth, while the grooves partially embed the teeth in the top of the axle. The teeth are secured in pairs by means of cap plates or bars 6, with grooved ends to embrace the respective teeth, and a single wood-screw, 7, applied centrally to each cap-plate. A very tight and secure rigid joint is thus formed between each rake-tooth and the axle. The ends of the axle are provided with metallic spindles to receive a pair of ground-wheels, 8, which may be constructed and secured on the spindles in ordinary manner. To provide for lifting the teeth by the draft of the horse, to discharge the hay at the will of the operator, the near end or face of each hub is provided with a series of ratchet-teeth, concentric with the spindle, and sliding pawl-bolts 9 are so supported as to engage with these teeth on the hubs, the ratchet-teeth and the effective ends of the pawl-bolts being so beveled as to bring square surfaces together in the forward motion of the respective wheels, and beveled or rejecting surfaces in the reverse movement of either wheel. The pawl-bolts 9 are guided by angle-plates 10, applied to the upper front corners of the axle, in connection with the shanks of the wheel-spindles. A hand-lever, 11, pivoted to the front of the axle so as to be convenient to the right hand of the driver, is connected by rods 12 to the bolts 9, and a retracting-spring, 13, applied to this hand-lever, serves to withdraw the bolts from mesh with the ratchet-teeth on the hubs, and to hold them in retracted condition. The rejection of the pawl-bolts by the ratchet-teeth on the hubs during the backward movements of the wheels is provided for by the application of yielding springs 14 to the connecting-rods 12, the same being applied between the hand-lever 11 and fixed collars on the connecting-rods. The pawl-bolts are thus held in mesh through the medium of these yielding springs; but the latter are subjected to no strain whatever, except as the bolts may come in contact with teeth when they are projected, or during the backing of one or both of the wheels, as in turning at the end of a through. For retaining the pawl-bolts 9 in their projected positions, a spring-catch, 15, is attached to the top of the axle, with face to the front, and so arranged as to engage with the hand-lever 11 above the springs. To trip this catch automatically when the teeth have been elevated to the required extent to discharge a load, a lifting-tappet, 16, is attached to the thill-frame in a proper position to engage with the face of the retaining-catch 15, so as to lift the latter without frictional movement between the parts. A very simple and effective retaining and tripping device is thus formed, and any excessive strain or wear on the parts is precluded. For holding the teeth to their work, and for regulating, by the same means, the working height of the teeth, a treadle-lever, 17, is hinged by a horizontal pivot-screw at the front of the thill-frame, and connected by a rod, 18, to a staple on the front of the axle. The treadle-lever 17 is connected to the rod 18 centrally, and has a laterally-projecting stirrup-bar, 19, at its front end, which occupies a position above the connecting-rod, so as to engage therewith to limit the descent of the teeth. This stirrup-bar receives the left foot of the driver, who is thus enabled to hold the teeth in working position, so as to ease them over ridges in the ground, and, generally, to regulate their action. A very slight pressure on the stirrup-bar is sufficient to retain the teeth in working position, or to assist in lowering the teeth.

The driver need not withdraw his foot from the treadle-lever at any time, but may follow its movement during the elevations of the teeth without difficulty.

The connecting-rod 18 is attached to the treadle-lever by means of a screw-arm, 20, receiving a nut, 21, and secured thereby in any one of a series of perforations, 22, Fig. 3, in the treadle-lever. By shifting the screw-arm 20 from one perforation to another, the working height of the teeth is adjusted, and this may be very quickly done, as the nut 21 is adapted to be turned by the fingers.

The operation is as follows: In going to and from the field, the rake-teeth may be retained in elevated position by means of the hand-lever 11 or the treadle-lever 17. When released, they drop to working position; or, should the axle bind to any extent, the teeth may be lowered by a slight pressure on the treadle-lever, and they are held in working position by this means. When a load has been collected by the teeth the hand-lever 11 is moved to the right, so as to engage with the catch 15, by which it is retained. This projects the pawl-bolts 9, and secures them in projected position, so as to lock the axle at both ends to the ground-wheels, but not in a rigid manner. Should either or both wheels be backed while the pawl-bolts are thus locked, the yielding springs 14 and the beveled faces of the hub-teeth and pawl-bolts are brought into play, and the latter are rejected by the hub-teeth without excessive strain on any part. The rake may consequently be backed or turned on either wheel, at any moment, without liability to injury. After the axle has been attached to the ground-wheels by means of pawl-bolts the continued forward movement of either or both wheels operates to turn the axle, and to discharge the load by the draft of the horse. When the teeth have attained a sufficient height the retaining-catch 15 comes in contact with the lifting-tappet 16, and the former is tripped. The hand-lever 11 is thus released, and the retracting-spring 13, acting thereon, withdraws the pawl-bolts from mesh with the teeth on the hubs of the ground-wheels, and the rake-teeth are returned to working position.

The broad idea of applying springs to the clutches, by which an oscillating rake-head axle is attached simultaneously at both ends to a pair of ground-wheels, is hereby disclaimed as old. A locking-catch, in combination with a hand-lever, for projecting clutch-slides at the end of a rake-axle and tripped otherwise than by means of a lifting-tappet, in the manner herein specified, is likewise disclaimed. Loose or pivoted rake-teeth attached in pairs by means of a single screw or bolt to each pair are known to be old, and are disclaimed as forming no part of the present invention.

The following is claimed as new in this invention, namely:

1. In combination with the thill-frame 1 and oscillating rake-head axle 2, the vertical hand-lever 11, pivoted directly on the front of the axle, the sliding pawl-bolts 9 9 at the ends of the axle, connecting-rods 12 12, the retracting-spring 13, applied between the upper end of the hand-lever 11 and the axle, the yielding springs 14 14, applied between the lower end of the hand-lever and collars on the connecting-rods, the horizontal retaining-catch 15, applied directly to the top of the axle, and the lifting-tappet 16, applied to the thill-frame, the same being constructed and operating as herein shown and described, for the purposes set forth.

2. In combination with the thill-frame 1 and oscillating rake-head axle 2, the perforated treadle-lever 17 and connecting-link 18, the former being provided with a laterally-projecting stirrup-bar, 19, at its rear end above the connecting-rod, to receive the foot of the driver, and to limit the descent of the teeth, and to prevent the lever and rod from locking as a toggle, and the connecting-rod having a screw-arm, 20, receiving a finger-nut, 21, and secured thereby in any one of the perforations 22 in the treadle-lever, to regulate the working height of the teeth, as herein specified.

3. The grooves 4 and sockets 5 in the top of the rake-head axle, in combination with the grooved cap plates or bars 6 and single wood-screws 7, for rigidly attaching the spring-teeth in pairs, in the manner herein specified.

CHAS. EDGAR.

Witnesses:
  JAS. L. EWIN,
  WALTER ALLEN.